(12) United States Patent
Ohdou et al.

(10) Patent No.: US 10,087,091 B2
(45) Date of Patent: Oct. 2, 2018

(54) SUBMERGED DISCHARGE DEVICE

(71) Applicant: DAIKIN INDUSTRIES, LTD., Osaka-shi, Osaka (JP)

(72) Inventors: Tsunahiro Ohdou, Osaka (JP); Masaya Nishimura, Osaka (JP); Tomoki Saitou, Osaka (JP); Sachiko Yamaguchi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/128,524

(22) PCT Filed: Mar. 12, 2015

(86) PCT No.: PCT/JP2015/001389
§ 371 (c)(1),
(2) Date: Sep. 23, 2016

(87) PCT Pub. No.: WO2015/146049
PCT Pub. Date: Oct. 1, 2015

(65) Prior Publication Data
US 2017/0107123 A1 Apr. 20, 2017

(30) Foreign Application Priority Data

Mar. 28, 2014 (JP) ................. 2014-068469

(51) Int. Cl.
*C02F 1/46* (2006.01)
*C02F 1/467* (2006.01)
*C02F 1/461* (2006.01)

(52) U.S. Cl.
CPC .......... *C02F 1/4672* (2013.01); *C02F 1/4608* (2013.01); *C02F 1/46109* (2013.01);
(Continued)

(58) Field of Classification Search
CPC ...... C02F 1/4672; C02F 1/46; C02F 2103/02; C02F 1/467; C02F 2201/46105;
(Continued)

(56) References Cited

U.S. PATENT DOCUMENTS

| | | | |
|---|---|---|---|
| 2009/0026088 A1* | 1/2009 | Sumida | C02F 1/461 205/742 |
| 2012/0048792 A1 | 3/2012 | Saitou et al. | |
| 2014/0014516 A1 | 1/2014 | Kumagai et al. | |

FOREIGN PATENT DOCUMENTS

| | | |
|---|---|---|
| JP | 2-070081 A | 3/1990 |
| JP | H06-333575 A | 12/1994 |

(Continued)

OTHER PUBLICATIONS

International Search Report (PCT/ISA/210) issued in PCT/JP2015/001389, dated Apr. 21, 2015.

*Primary Examiner* — Walter Dean Griffin
*Assistant Examiner* — Cameron J Allen
(74) *Attorney, Agent, or Firm* — Birch, Stewart, Kolasch & Birch, LLP

(57) ABSTRACT

In a submerged discharge device, a pair of electrodes is arranged in a liquid in a reservoir to receive an alternating voltage from an alternating power source, thereby generating a submerged discharge using a discharger arranged in the liquid between the pair of electrodes. A surface of this pair of electrodes has a coating that ensures the submerged discharge generated by the discharger. This may reduce the area of contact between the surface of the pair of electrodes and the liquid in the treatment vessel to reduce the consumption of the pair of electrodes.

6 Claims, 6 Drawing Sheets

(52) U.S. Cl.
CPC .............. *C02F 2001/46138* (2013.01); *C02F 2201/4613* (2013.01); *C02F 2201/46175* (2013.01)

(58) Field of Classification Search
CPC ...... C02F 2303/04; B01F 3/04; B01F 3/0424; B01F 2003/04943; B01F 2215/0052; B01F 2003/04886
See application file for complete search history.

(56) References Cited

FOREIGN PATENT DOCUMENTS

| | | |
|---|---|---|
| JP | H10-271942 A | 10/1998 |
| JP | 3267779 B2 | 1/2002 |
| JP | 2011-092920 A | 5/2011 |
| JP | 2013-031803 A | 2/2013 |
| JP | 2013-138986 A | 7/2013 |
| KR | 10-0541467 B1 | 12/2005 |

\* cited by examiner

SUBMERGED DISCHARGE DEVICE

TECHNICAL FIELD

The present invention relates to improvement in submerged discharge devices, and more particularly relates to a countermeasure to reduce the consumption of a pair of electrodes of a submerged discharge device.

BACKGROUND ART

Conventionally known water treatment systems generate an electric discharge in water to produce bactericidal factors. For example, Patent Document 1 discloses this type of water treatment system. The water treatment system of Patent Document 1 purifies water for humidification stored in a tank. Specifically, this water treatment system generates an electric discharge in the water stored in the tank, and sterilizes the water in the tank by using bactericidal factors, such as hydroxyl radicals, produced by the electric discharge.

CITATION LIST

Patent Document

PATENT DOCUMENT 1: Japanese Unexamined Patent Publication No. 2011-092920

SUMMARY OF THE INVENTION

Technical Problem

If a pair of electrodes of the submerged discharge device is made of platinum, a submerged discharge may be satisfactorily generated without causing consumption of the electrodes. However, platinum is expensive.

To address this problem, the pair of electrodes may be made of, for example, a lower cost metal than platinum, such as titanium. However, this idea has the following drawback. If, for example, an alternating voltage is applied between the pair of electrodes in an underwater discharge, the reference value of the alternating voltage is usually set to be zero, and the pulse width (duty cycle) during a positive phase of the alternating voltage is set to be equal to that during a negative phase of the alternating voltage. Actually, the reference value of the alternating voltage may be slightly offset in a positive or negative direction, or the pulse width (duty cycle) during the positive phase of the alternating voltage may differ from that during the negative phase of the alternating voltage. In these cases, an oxidation-reduction reaction occurs on a surface of each of the pair of electrodes during the underwater discharge. Thus, the amount of metal ions eluted from an electrode material of one of the electrodes into water increases, and the long-term use of the submerged discharge device causes consumption of the electrodes.

In view of the foregoing background, it is therefore an object of the present invention to reduce the consumption of a pair of electrodes in a submerged discharge device even if the pair of electrodes is made of a metal other than platinum, or any other material.

Solution to the Problem

To achieve the object, a submerged discharge device according to the present invention includes: an alternating power source (33); a pair of electrodes (31, 32) arranged in a liquid in a reservoir (11), the pair being configured to receive an alternating voltage from the power source (33); and a discharger (36) arranged between the pair of electrodes (31, 32), the discharger (36) being configured to generate a submerged discharge somewhere along a current path between the pair of electrodes (31, 32). A surface of the pair of electrodes (31, 32) has a coating (31a, 32a, 31b, 32b, 31c, 32c) configured to allow a submerged discharge to be generated by the discharger (36), and to reduce consumption of the pair of electrodes (31, 32).

According to the present invention, the surface of the pair of electrodes has the coating. This reduces the area of contact between the pair of electrodes and the liquid during a submerged discharge. As a result, elusion of ions from the pair of electrodes into the liquid, electrode separation, and other problems may be reduced, thereby reducing the consumption of these electrodes.

In the submerged discharge device according to the present invention, the pair of electrodes (31, 32) may be made of titanium, and the coating (31a, 32a) may be a film made of titanium oxide.

Specifically, according to the present invention, the pair of electrodes is made of a titanium metal, and the coating is made of titanium oxide obtained by oxidizing the titanium. Thus, the titanium oxide film covers the surface of the titanium electrodes, and the presence of the titanium oxide film reduces the area of contact between the pair of electrodes and the liquid during a submerged discharge. As a result, elusion of titanium ions from the pair of titanium electrodes into the liquid is restricted, thereby reducing the consumption of the titanium electrodes.

In the submerged discharge device according to the present invention, the coating (31b, 32b) may be a conductive resin covering a surface of the pair of electrodes (31, 32).

According to the present invention, the coating is the conductive resin configured as, for example, a conductive polymer covering the surface of the pair of electrodes. Thus, the presence of the coating made of the conductive resin reduces the area of contact between the pair of electrodes and the liquid during a submerged discharge. As a result, elusion of ions from the pair of electrodes into the liquid and other problems are restricted, thereby reducing the consumption of the pair of electrodes.

In the submerged discharge device according to the present invention, the pair of electrodes (31, 32) may be made of carbon fibers, and the coating (31c, 32c) may be a conductive resin impregnated in the surface of the pair of electrodes (31, 32).

According to the present invention, the coating is the conductive resin impregnated in the surface of the pair of carbon fiber electrodes. Thus, the presence of the conductive resin impregnated in the surface of the carbon fiber electrodes reduces the area of contact between the pair of carbon fiber electrodes and the liquid during a submerged discharge. As a result, separation of an outer portion of the carbon fiber electrodes from the pair of carbon fiber electrodes due to heat, and other problems are restricted, thereby reducing the consumption of the pair of carbon fiber electrodes.

In the submerged discharge device according to the present invention, the discharger (36) may include an insulative divider (15) having a through hole (35), and may generate a submerged discharge in the through hole (35) of the divider (15) to sterilize the liquid in the reservoir (11).

According to the present invention, the discharger generates a submerged discharge in the through hole of the divider. As a result, bactericidal factors are produced in the liquid in the reservoir to sterilize the liquid in the reservoir.

Advantages of the Invention

As can be seen from the foregoing description, a submerged discharge device according to the present invention may allow a coating formed on a surface of a pair of electrodes of the submerged discharge device to reduce the consumption of the pair of electrodes while ensuring a satisfactory submerged discharge generated by the discharger.

DESCRIPTION OF EMBODIMENTS

Embodiments of the present invention will now be described in detail with reference to the drawings. Note that the following description of embodiments is intended to provide only exemplary embodiments, and is not intended to limit the scope, application, or uses of the present invention.

Figure 1:
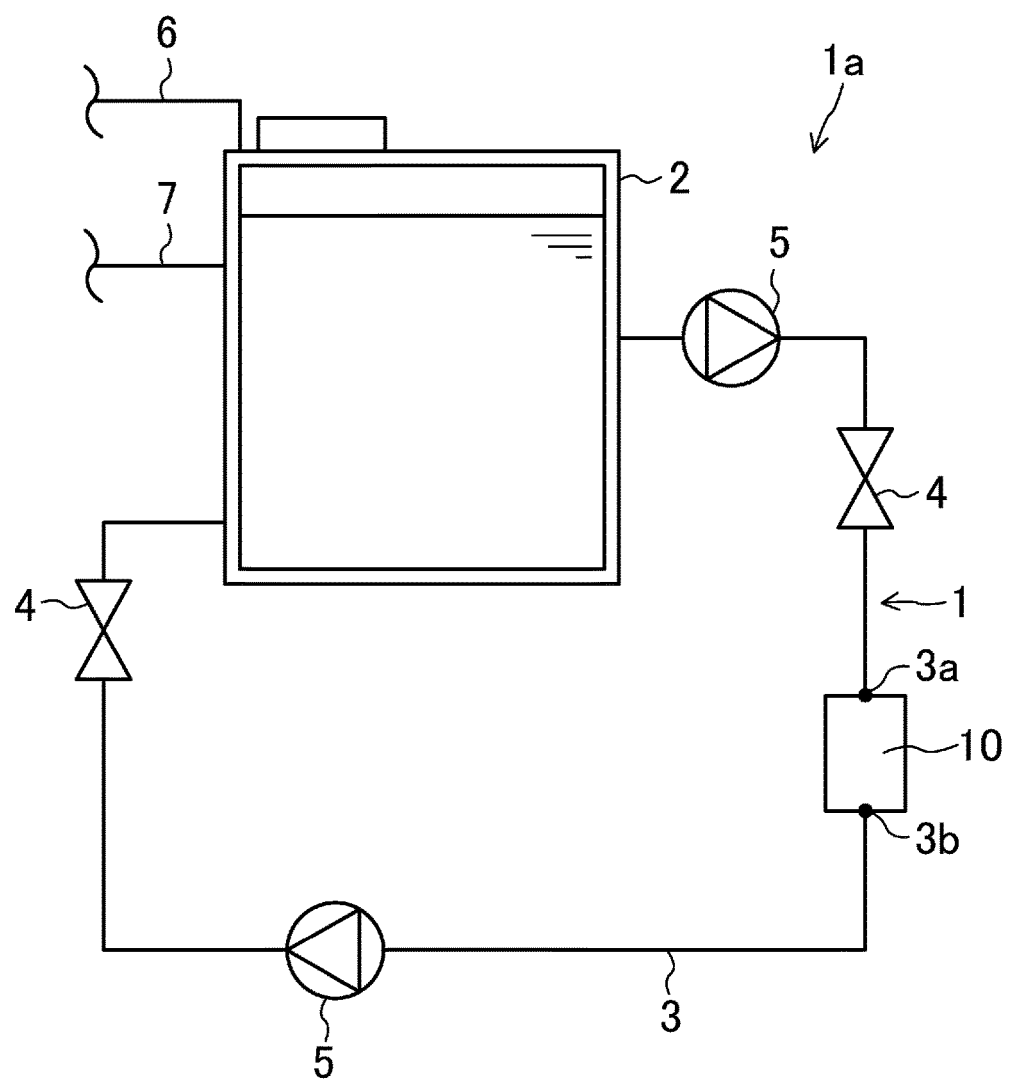
FIG. 1 is a diagram of a piping system illustrating a water tank and a water circulation circuit according to an embodiment.

As shown in FIG. 1, a water treatment system (1a) according to an embodiment of the present invention includes a water circulation circuit (1) and a water tank (2).

The water tank (2) stores water (including hot water, the same hereinafter). The water tank (2) is connected to the water circulation circuit (1), a first channel pipe (6), and a second channel pipe (7).

The water circulation circuit (1) stirs and circulates the water in the water tank (2). In the water circulation circuit (1), a water pipe (3), two on-off valves (4, 4), two pumps (5, 5), and a water treatment unit (10) are connected together. The specific structure of the water treatment unit (10) will be described later.

The water may circulate inside the water pipe (3). One end of the water pipe (3) is connected to the side surface of the water tank (2) on the left of the figure. The other end of the water pipe (3) is connected to the side surface of the water tank (2) on the right of the figure. The water pipe (3) is, at intermediate portions, connected to the two pumps (5, 5), the two on-off valves (4, 4), and the water treatment unit (10).

The on-off valves (4, 4) are configured to open and close the passage of the water pipe (3). One of the two on-off valves (4, 4) is provided at the inflow side of the water treatment unit (10). The other one is provided at the outflow side of the water treatment unit (10). One of the two pumps (5, 5) is provided between the on-off valve (4) at the inflow side of the treatment unit (10) and the water tank (2). The other one is provided between the water treatment unit (10) and the on-off valve (4) at the outflow side of the treatment unit (10). When the on-off valves (4, 4) open, the water circulates inside the water pipe (3). When the on-off valves (4, 4) close, the water in the water pipe (3) stops circulating.

—Structure of Water Treatment Unit—

Figure 2:
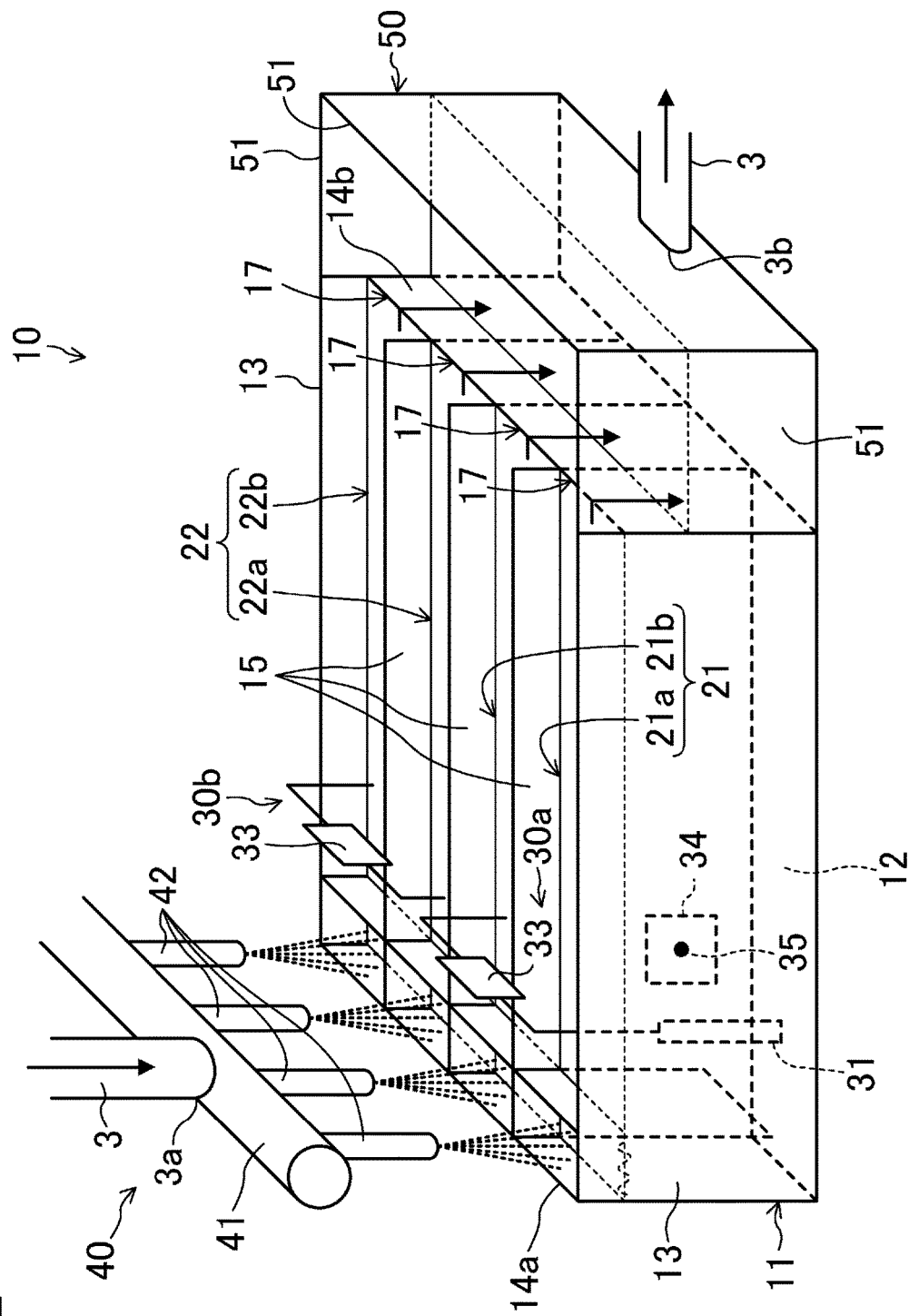
FIG. 2 illustrates a water treatment unit according to an embodiment.
Figure 3:
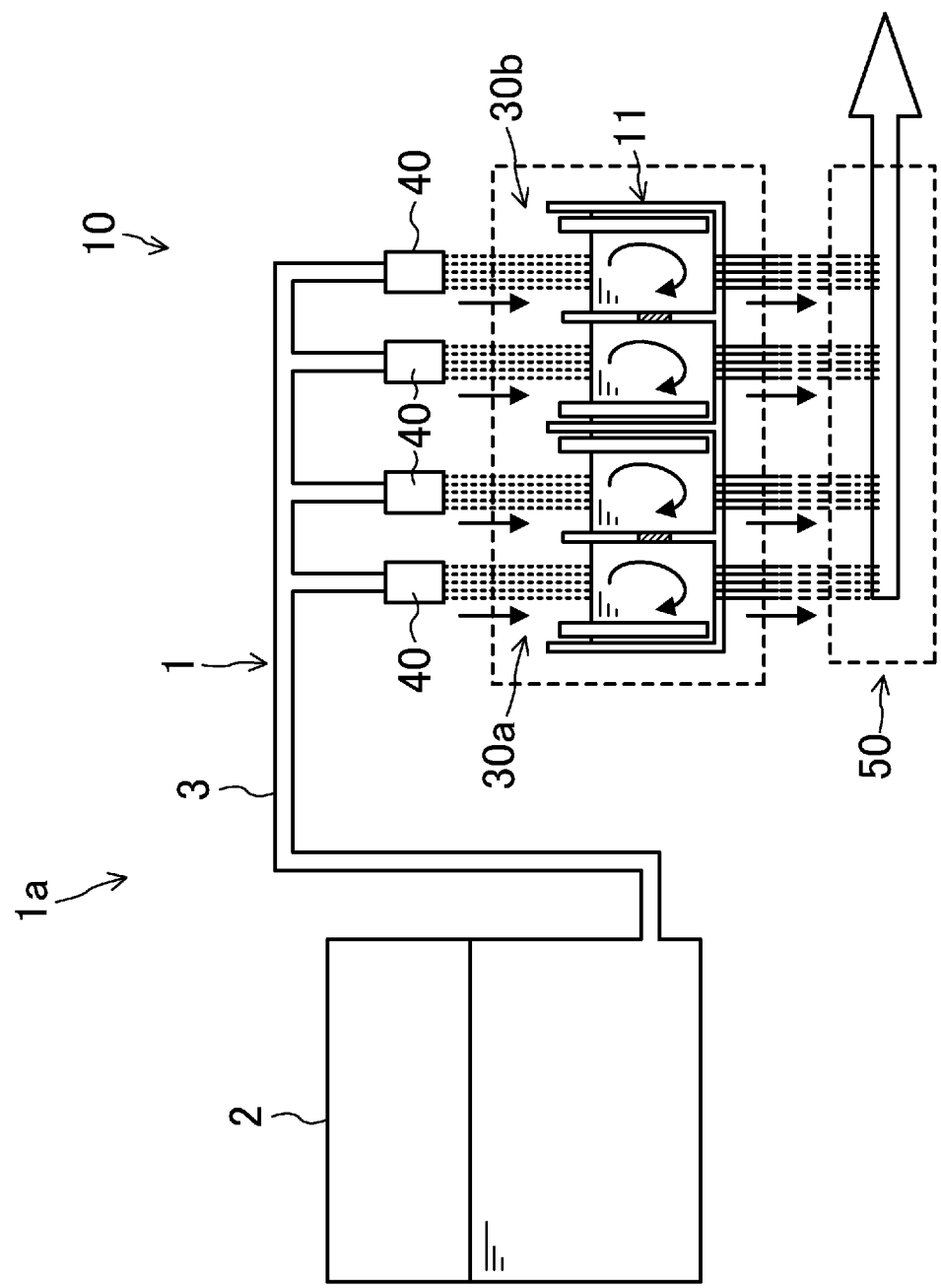
FIG. 3 schematically illustrates a water treatment unit according to an embodiment.

As shown in FIGS. 2 and 3, the water treatment unit (10) purifies the water flowing from an inlet (3a) of the water pipe (3) and allows the purified water to flow out of an outlet (3b) of the water pipe (3). This water treatment unit (10) includes a spray apparatus (40), a treatment vessel (11), a downstream vessel (50), and a plurality of discharge units (30a, 30b). The water treatment unit (10) supplies the water flowing from a portion of the water pipe (3) upstream of the water treatment unit (10) from the spray apparatus (40) to the treatment vessel (11), and purifies the water in the treatment vessel (11) using bactericidal factors produced by the discharge units (30a, 30b). Then, the water treatment unit (10) supplies the purified water to the downstream vessel (50), and allows the purified water to flow from the downstream vessel (50) to a portion of the water pipe (3) downstream of the water treatment unit (10).

The treatment vessel (11) is a box-like water vessel formed in a substantially rectangular shape as viewed from above. Specifically, the treatment vessel (11) includes a bottom (12), long walls (13, 13), and short walls (14a, 14b). The bottom (12) is a flat plate formed in a substantially rectangular shape as viewed from above. Each long wall (13, 13) is a flat plate formed in a horizontally elongated, substantially rectangular shape, and standing upward on one of the long sides of the bottom (12). Each short wall (14a, 14b) is a flat plate formed in a vertically elongated, substantially rectangular shape, and standing upward on one of the short sides of the bottom (12). As compared to the short wall (14a) of the treatment vessel (11) at one longitudinal end (i.e., the inflow side) and the long walls (13, 13), the short wall (14b) of the treatment vessel (11) at the other longitudinal end (i.e., the outflow side) is formed to have a lower height, thereby providing outlets (17). This treatment vessel (11) serves as a reservoir according to the present invention.

Figure 4:
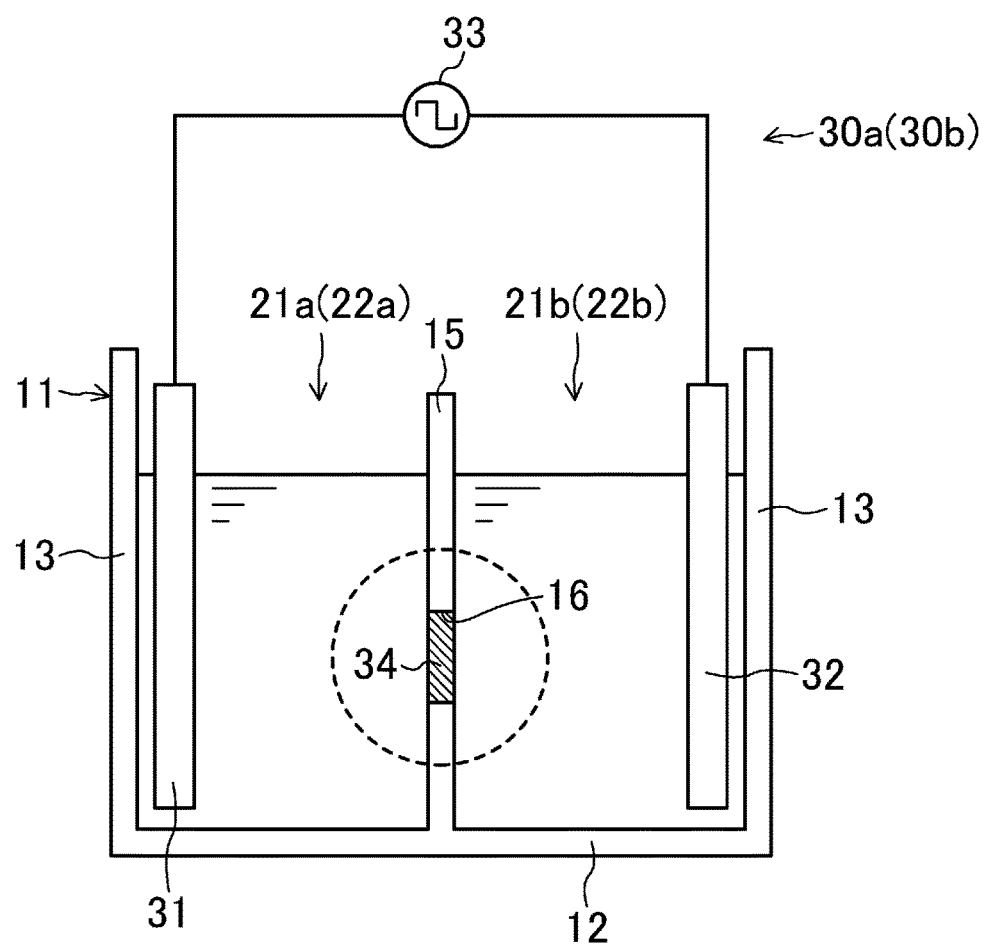
FIG. 4 is a schematic cross-sectional view illustrating a discharge unit according to an embodiment.

Inside the treatment vessel (11), a plurality of dividers (15) are arranged in a width direction at predetermined intervals. Each divider (15) is a flat plate formed in a substantially rectangular shape, which is laterally long. The dividers (15) are arranged along the length of the treatment vessel (11) to divide the inside of the treatment vessel (11) into a plurality of lanes (21a-22b). The dividers (15) are made of an electrically insulating material. The divider (15, . . . , 15) in each of a first path (21) and a second path (22), which will be described later, has an opening (16), as shown in FIG. 4. In the treatment vessel (11), the dividers (15) form first to fourth lanes (21a-22b) arranged in this order from the bottom of the paper of FIG. 2. The number of the lanes (21a-22b) formed in the treatment vessel (11) is a mere example and may be changed as appropriate in accordance with the amount of the water purified by the water treatment unit (10).

Out of the lanes (21a-22b), the pair of the first and second lanes (21a and 21b) forms the first path (21), and the pair of the third and fourth lanes (22a and 22b) forms the second path (22).

As shown in FIG. 4, the plurality of discharge units (30a, 30b) includes a first discharge unit (30a) and a second discharge unit (30b). Each discharge unit (30a, 30b) is provided for one of the above-described pairs of lanes (21a and 21b, 22a and 22b).

The first discharge unit (30a) purifies the water in the first path (21). The first discharge unit (30a) includes a pair of electrodes (31, 32), a high-voltage generator (33), and the divider (15) with the above-described opening (16). The high-voltage generator (33) is connected to the pair of electrodes (31, 32) and applies a predetermined voltage to the pair of electrodes (31, 32). The divider (15) includes a discharge member (34). The second discharge unit (30b) purifies the water in the second path (22). The specific structure of the second discharge unit (30b) is similar to that of the first discharge unit (30a), which is why the description thereof will be omitted.

The pair of electrodes (31, 32) generates a discharge in water, and includes a hot-side electrode (31) and a neutral-side electrode (32). The electrode (31) is a flat plate placed in the first lane (21a). The electrode (31) is connected to the high-voltage generator (33). The electrode (32) is a flat plate placed in the second lane (21b). The electrode (32) is connected to the high-voltage generator (33). The electrode (31) is substantially parallel to the electrode (32). The electrodes (31, 32) are made of, for example, a metal material which is highly resistant to corrosion.

Figure 5:
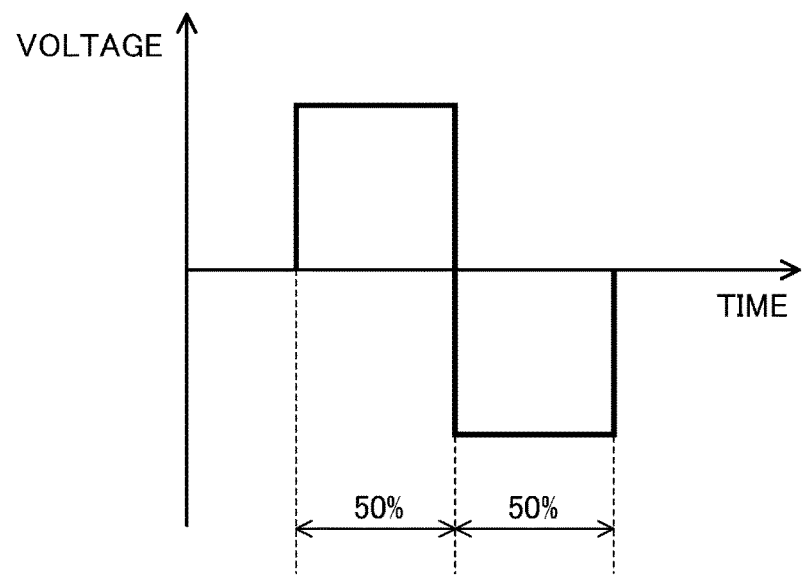
FIG. 5 illustrates the waveform of a voltage according to an embodiment.

The high-voltage generator (33) is a power source applying a predetermined voltage to the pair of electrodes (31, 32). In this embodiment, an example will be described where the high-voltage generator (33) applies a voltage with an alternating waveform, which alternates between positive and negative values to the pair of electrodes (31, 32), as shown in FIG. 5. The high-voltage generator (33) serves as a power source of an alternating type according to the present invention. The duty of the alternating waveform (a square wave) is adjusted to have the same positive and negative excursions. The voltage applied to the pair of electrodes (31, 32) is a mere example. The waveform does not have to be the square wave but may be a sinusoidal wave as long as the voltage is an alternating voltage.

Figure 6:
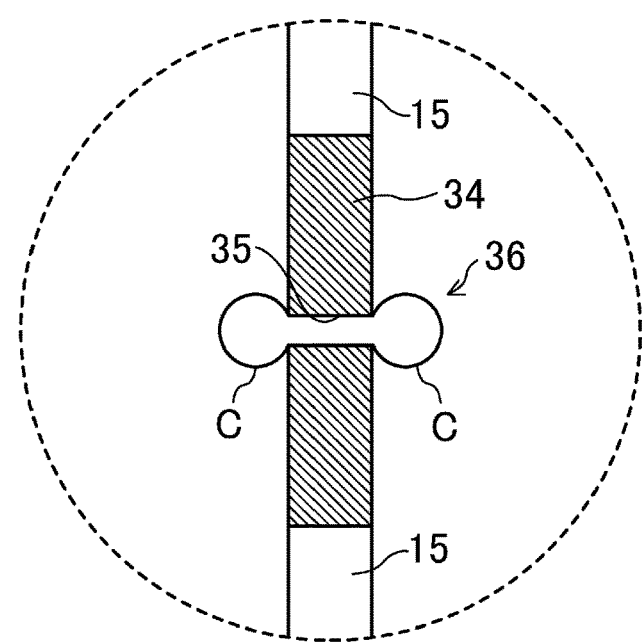
FIG. 6 is a partial enlarged view of a discharge unit according to an embodiment.

The discharge member (34) is a plate-like insulating member. The discharge member (34) is made of an electrically insulating material such as a ceramic material. The ceramic material includes aluminum nitride, silicon nitride, zirconia, and alumina. The discharge member (34) is arranged to close the opening (16) of the divider (15) separating the first lane (21a) and the second lane (21b). A discharge hole (35), which is a small through hole, is cut almost in the center of the discharge member (34). The discharge hole (35) is designed to have, for example, an electrical resistance of several MΩ. The discharge hole (35) defines a path of current to flow between the electrode (31) and the electrode (32). The discharge hole (35) described above serves as a density of current concentrator, which increases the density of current in the path of current to flow between the pair of electrodes (31, 32). As shown in FIG. 6, when a voltage of the high-voltage generator (33) is applied between the pair of electrodes (31, 32), the density of current in the path of current increases such that Joule heat vaporizes the water in the discharge hole (35) of the discharge member (34) to produce bubbles (C). Thus, the electrodes (31, 32) and the water have the same potential, and a discharger (36) is formed to allow the interface between each bubble (C) and the water to serve as an electrode to generate an underwater discharge (i.e., a spark discharge). In this discharge, since the electrode (31) and the electrode (32) do not serve as the discharge electrodes, the electrodes (31, 32) are less degraded by the discharge.

The spray apparatus (40) is connected to the water pipe (3), and sprays the water flowing from the inlet (3a) of the water pipe (3) to supply the water to the treatment vessel (11). The spray apparatus (40) includes a nozzle header (41), and a plurality of spray nozzles (42) provided for the respective lanes (21a-22b).

The nozzle header (41) is an elongated pipe. The nozzle header (41) is, at the side surface, connected to the water pipe (3), and divides the water from the water pipe (3) into the spray nozzles (42).

The plurality of spray nozzles (42) are provided at predetermined intervals in the longitudinal direction of the nozzle header (41). Each of the spray nozzles (42) is provided for an associated one of the lanes (21a-22b). The water flowing through the water pipe (3) flows from the inlet (3a) to the nozzle header (41), and is sprayed as particles (or droplets) from the spray nozzles (42) to the associated lanes (21a-22b). At this time, since the water sprayed from the spray nozzles (42) turns into the particles (or the droplets), air is interposed between the particles (or between the droplets) to increase the electrical resistance. This electrically insulates the water flowing from the inlet (3a) of the water pipe (3) from the water flowing through the treatment vessel (11). The spraying with the spray nozzles (42) generates an electrical resistance of hundreds of MΩ or more between the water at the inlet (3a) of the water pipe (3) and the water in the treatment vessel (11).

The downstream vessel (50) is a water vessel provided at the outflow side of the treatment vessel (11). The water flows down from the treatment vessel (11) and flows as drops into the downstream vessel (50). The downstream vessel (50) is a box in a substantially rectangular shape as viewed from above, and includes outer walls (51). The outer walls (51) of the downstream vessel (50) have the same height as the long walls (13) and the inflow-side short wall (14a) of the treatment vessel (11). The downstream vessel (50) is connected to the outlet (3b) of the water pipe (3). The outflow-side short wall (14b) of the treatment vessel (11) separates the downstream vessel (50) from the treatment vessel (11). Since the short wall (14b) includes the outlets (17), the water stored in the treatment vessel (11) energetically flows down like a fall from the outlets (17) toward the bottom of the downstream vessel (50) before the treatment vessel (11) is filled up. There is a predetermined height between the outlets (17) and the bottom of the downstream vessel (50) or the surface of the water stored in the downstream vessel (50). Thus, the water in the treatment vessel (11) becomes drops when flowing down from the outlets (17) to the downstream vessel (50). The water flowing down to the downstream vessel (50) turns into the drops (i.e., the particles or the droplets), thereby interposing the air between the particles (or between the droplets) to increase the electrical resistance. This electrically insulates the water stored in the treatment vessel (11) from the water flowing through the downstream vessel (50). The electrical resistance between the treatment vessel (11) and the downstream vessel (50) is hundreds of MΩ or more. After that, the water flowing through the downstream vessel (50) flows out of the outlet (3b) of the water pipe (3).

—Structure of Electrodes—

Figure 7:
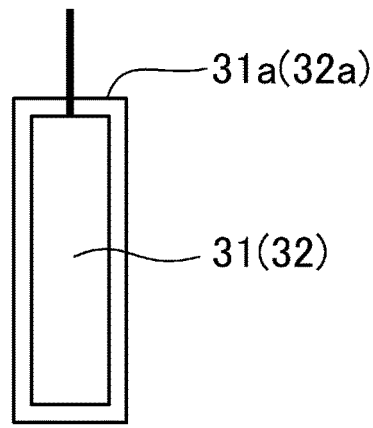
FIG. 7 is a general configuration diagram of one of a pair of electrodes.

FIG. 7 shows a configuration for one of the pair of electrodes, namely the electrode (31), and its surroundings. The configuration for the other electrode, namely the electrode (32), and its surroundings is similar to that for the electrode (31) and its surroundings. Components of this electrode (32) are each denoted by a reference character in parentheses. In FIG. 7, the electrode (31) is made of a metal such as titanium. A surface of the titanium electrode (31) has an oxide film (31a) formed thereon, and made of titanium oxide obtained by oxidizing the surface of the titanium electrode (31). If this oxide film (31a) is formed thick, it completely covers the entire surface of the titanium electrode (31), so that the titanium electrode (31) serves as a perfect insulator. As a result, no current path is formed in the water in the treatment vessel (11), and no underwater discharge is performed. Thus, the oxide film (31a) is formed thin enough to enable an underwater discharge.

—Operation—

In the water treatment system (1a) according to this embodiment, the water treatment unit (10) treats the water flowing through the water pipe (3).

Before the water treatment unit (10) starts operating, the on-off valves (4, 4) of the water circulation circuit (1) open so that the water in the water tank (2) flows through the water pipe (3). The water flowing through the water pipe (3) flows from the inlet (3a) via a pump (5) into the nozzle header (41) and is sprayed from the spray nozzles (42) to the lanes (21a-22b). Then, the water is stored in the treatment vessel (11). At this time, since the sprayed water has turned into the particles (or the droplets), the air is interposed between the particles (or between the droplets) to increase the electrical resistance. This electrically insulates the water flowing from the inlet (3a) of the water pipe (3) from the water flowing through the treatment vessel (11).

When the water treatment unit (10) starts operating, the treatment vessel (11) contains water. The high-voltage generator (33) applies, to the pair of electrodes (31, 32), a voltage with a square wave having the same positive and negative excursions. This increases the density of current in the path of current of the discharge hole (35) of the discharge member (34).

When the density of current in the path of current of the discharge hole (35) increases, the Joule heat inside the discharge hole (35) increases. As a result, the vaporization of the water progresses to produce the bubbles (C) in the vapor phase inside and near the inlet and outlet of the discharge hole (35) of the discharge member (34). As shown in FIG. 6, each bubble (C) entirely covers the end of the discharge hole (35). In this state, the bubbles (C) function as resistors hindering electrical conduction through the water between the electrode (31) and the electrode (32). There is then almost no potential difference between the electrodes (31, 32) and the water, and the interface between each bubble (C) and the water serves as an electrode. This causes dielectric breakdown inside the bubble (C) to generate an electric discharge (i.e., a spark discharge).

As described above, when an electric discharge is generated in the bubble (C), bactericidal factors (e.g., active species such as hydroxyl radicals) are generated in the water in the treatment vessel (11).

After that, the water flowing through the lanes (21a-22b) of the treatment vessel (11) flows down from the outlets (17) to the downstream vessel (50). At this time, the water flowing down from the outlets (17) to the downstream vessel (50) becomes drops, thereby interposing the air between the particles (or between the droplets) to increase the electrical resistance. This electrically insulates the water stored in the treatment vessel (11) from the water flowing through the downstream vessel (50).

—Operation and Advantages of Embodiment—

As described above, the titanium oxide film (31a, 32a) of the pair of titanium electrodes (31, 32) is thin enough to enable an underwater discharge in the treatment vessel (11). Thus, the electrical resistance between the pair of titanium electrodes (31, 32) and the water in the treatment vessel (11) is lower than that of the bubble (C) formed in the discharge hole (35). This causes dielectric breakdown inside the bubble (C) in the discharge hole (35) to generate an underwater discharge in the discharge hole (35).

Since the high-voltage generator (33) is of the alternating type, the polarity of the voltage applied to the pair of electrodes (31, 32) alternates from positive to negative, or vice versa, at predetermined intervals. Thus, in the discharge hole (35), a spark discharge may be generated with no glow discharge generated. Specifically, in the case of the DC current, the form of the discharge changes from a spark discharge to a glow discharge with an increase in the current. In this embodiment, however, since the polarity of the voltage applied to the pair of electrodes (31, 32) alternates from positive to negative, or vice versa, before the form of the discharge changes to the glow discharge, the spark discharge may be continuously generated in the discharge hole (35) with no glow discharge generated. In this case, if, for example, the reference potential of the high-voltage generator (33) is not at a desired zero potential and is offset in a positive or negative direction, or if the pulse width during the positive phase of a potential from the alternating power source (33) is different from that during the negative phase of the potential, the amount of titanium metal ions eluted from one of the electrodes (31, 32) increases, but the oxide film (31a, 32a) present on the surface of each titanium electrode (31, 32) reduces the area of contact between the titanium electrodes (31, 32) and the water in the treatment vessel (11). Thus, the amount of titanium metal ions eluted from the surface of the electrodes (31, 32) into the water is restricted. As a result, the consumption of the titanium electrodes (31, 32) may be reduced, the titanium electrodes (31, 32) may be maintained in a good condition over an extended period of time, and the time for replacement of the titanium electrodes (31, 32) may be postponed.

In addition, if the oxide film (31a, 32a) functions as a capacitance film in an electrical equivalent circuit obtained by performing the underwater discharge, the capacitance is proportional to the surface area of the oxide film (31a, 32a) and inversely proportional to the thickness of the oxide film (31a, 32a). Thus, by adjusting the surface area or thickness of the oxide film (31a, 32a), the characteristics of the discharge circuit of the underwater discharge may be controlled.

<First Variation of Electrode and Coating>

Figure 8:
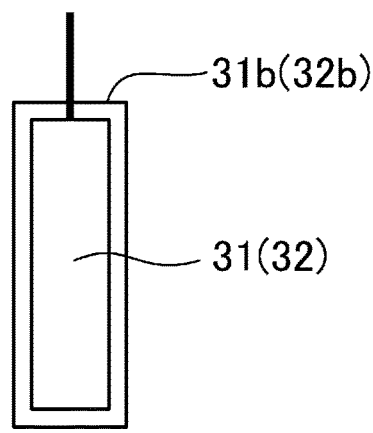
FIG. 8 is a general configuration diagram of one of a pair of electrodes according to a first variation.

FIG. 8 shows one of a pair of electrodes (31, 32) and a coating on the surface of the electrode according to a first variation.

In the foregoing embodiment, each electrode (31, 32) is made of titanium metal, and the coating is made of titanium oxide (oxide film) (31a, 32a). In this variation, however, while the electrodes are titanium electrodes as in the foregoing embodiment, the coating covering the surface of the pair of titanium electrodes (31, 32) is made of a conductive resin (31b, 32b) which allows a submerged discharge in the discharge hole (35).

Thus, since in this variation the coating is made of the conductive resin (31b, 32b) which allows a submerged discharge in the discharge hole (35), a satisfactory underwater discharge in the treatment vessel (11) may be ensured. In addition, since the surface of each titanium electrode (31, 32) is coated with the conductive resin (31b, 32b), the area of contact between the titanium electrodes (31, 32) and the water in the treatment vessel (11) decreases to restrict the amount of titanium metal ions eluted from the surface of the titanium electrodes (31, 32) into the water, thereby reducing the consumption of the titanium electrodes (31, 32).

<Second Variation of Electrode and Coating>

Figure 9:
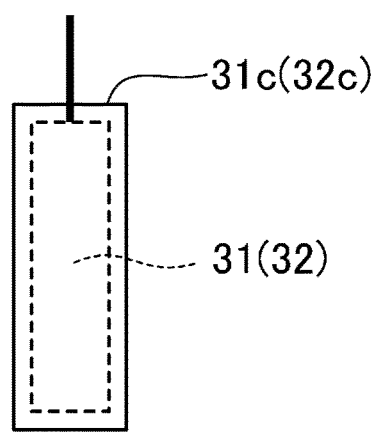
FIG. 9 is a general configuration diagram of one of a pair of electrodes according to a second variation.

FIG. 9 shows one of a pair of electrodes (31 and 32) and a coating on the surface of the electrode according to a second variation.

In the second variation, the pair of electrodes (31, 32) is made of carbon fibers, and the coating is made of a resin (31c, 32c) impregnated in the surface of the pair of electrodes (31, 32) to the extent that a submerged discharge may be generated in the discharge hole (35).

Thus, in this variation, even if the resin (31c, 32c) impregnated in the surface of the pair of carbon fiber electrodes (31, 32) is present during the underwater discharge in the treatment vessel (11), a submerged discharge in the discharge hole (35) is satisfactorily performed. In addition, the resin (31c, 32c) impregnated in the surface of the pair of carbon fiber electrodes (31, 32) reduces the area of contact between the carbon fiber electrodes (31, 32) and the water in the treatment vessel (11). This may substantially prevent an oxidation-reduction reaction of the surface of the carbon fiber electrodes (31, 32) with the water from causing the surface of the electrodes (31, 32) to generate heat and to become powder charcoal. Thus, separation of the powder charcoal from the surface of the electrodes (31, 32) may be restricted. As a result, the consumption of the carbon fiber electrodes (31, 32) may be reduced, and the time for replacement of the carbon fiber electrodes (31, 32) may be postponed.

(Other Embodiments)

In the foregoing description, the water treatment unit (10) generates a spark discharge in water stored in the treatment vessel (11) to produce sterile water. According to the present invention, however, a medium used to generate an electric discharge does not have to be water, and may be any other liquid.

INDUSTRIAL APPLICABILITY

As can be seen from the foregoing description, the present invention is useful for a submerged discharge device including a pair of electrodes provided in a liquid.

DESCRIPTION OF REFERENCE CHARACTERS

11 Treatment Vessel (Reservoir)
15 Divider
31, 32 Electrode
33 High-Voltage Generator (Alternating Power Source)
35 Discharge Hole (Through Hole)
31a, 32a Oxide Film (Coating)
31b, 32b Conductive Resin (Coating)
31c, 32c Resin (Coating)
36 Discharger

The invention claimed is:

1. A submerged discharge device comprising:
an alternating power source;
a pair of electrodes arranged in a liquid in a reservoir, the pair being configured to receive an alternating voltage from the power source; and
a discharger arranged between the pair of electrodes, the discharger comprising an insulative divider having a singular through hole, a current path between the pair of electrodes being defined in part by the through hole, the discharger being configured to generate a submerged discharge in the through hole, wherein
a surface of the pair of electrodes has a coating configured to allow the submerged discharge to be generated by the discharger, and to reduce consumption of the pair of electrodes,
the pair of electrodes is made of carbon fibers, and
the coating is a conductive resin impregnated in the surface of the pair of electrodes.

2. The submerged discharge device of claim 1, wherein the discharger
generates the submerged discharge in the through hole of the divider to sterilize the liquid in the reservoir.

3. The submerged discharge device of claim 1, wherein along the current path between the pair of electrodes, the generation of submerged discharges is limited to the singular through hole of the divider.

4. A submerged discharge device comprising:
an alternating power source;
a pair of electrodes arranged in a liquid in a reservoir, the pair being configured to receive an alternating voltage from the power source; and
a discharger arranged between the pair of electrodes, the discharger comprising an insulative divider having a singular through hole, a current path between the pair of electrodes being defined in part by the through hole, the discharger being configured to generate a submerged discharge in the through hole, wherein
a surface of the pair of electrodes has a coating configured to allow the submerged discharge to be generated by the discharger, and to reduce consumption of the pair of electrodes, and
the coating is a conductive resin covering a surface of the pair of electrodes.

5. The submerged discharge device of claim 4, wherein the discharger
generates the submerged discharge in the through hole of the divider to sterilize the liquid in the reservoir.

6. The submerged discharge device of claim 4, wherein along the current path between the pair of electrodes, the generation of submerged discharges is limited to the singular through hole of the divider.

* * * * *